United States Patent [19]

Park

[11] Patent Number: 5,648,878

[45] Date of Patent: *Jul. 15, 1997

[54] INTEGRALLY DRIVEN THREE BEAM-TYPE PROJECTION APPARATUS

[75] Inventor: Jun-Hyun Park, Seoul, Rep. of Korea

[73] Assignee: Daewoo Electronics Co., Ltd., Seoul, Rep. of Korea

[*] Notice: The term of this patent shall not extend beyond the expiration date of Pat. No. 5,537,169.

[21] Appl. No.: 623,574

[22] Filed: Mar. 28, 1996

[30] Foreign Application Priority Data

Mar. 31, 1995 [KR] Rep. of Korea ..................... 95-7421

[51] Int. Cl.$^6$ .................. G02B 3/00; G02B 27/00; G03B 21/26; G03B 3/00
[52] U.S. Cl. .................. 359/809; 359/810; 353/94; 353/101
[58] Field of Search .................. 359/809, 810, 359/819, 821, 808, 694, 695, 696; 353/31, 94, 100, 101

[56] References Cited

U.S. PATENT DOCUMENTS

| | | |
|---|---|---|
| 5,125,733 | 6/1992 | Lee ................................. 353/7 |
| 5,426,471 | 6/1995 | Tanaka ........................... 348/745 |
| 5,537,169 | 7/1996 | Park ................................ 353/101 |
| 5,586,818 | 12/1996 | Lee ................................. 353/101 |

*Primary Examiner*—Georgia Y. Epps
*Assistant Examiner*—Ricky Mack
*Attorney, Agent, or Firm*—Foley & Lardner

[57] ABSTRACT

Disclosed is a three beam-type projection apparatus in which three projectors can be transported integrally by a single driving motor. A first and a second projecting lenses are formed in the front of first and second projectors, respectively. First and second guiding grooves are formed thereon. The two projectors are connected by a plurality of guiding rods. A third projecting lens is formed in the front of a third projector and an inserting hole is formed on the lower portion of the third projector. A guiding plate is combined with the first, second and third projectors, and is transported forward and backward by a driving apparatus. A fixing plate is provided with a parallel guiding hole formed along the length of the third projector and with an inclined guiding hole for guiding the transportation of the third projector. The three projectors can be transported by a driving motor and the operation of the apparatus is very accurate and advantageous.

9 Claims, 2 Drawing Sheets

INTEGRALLY DRIVEN THREE BEAM-TYPE PROJECTION APPARATUS

BACKGROUND OF THE INVENTION

1. Field of the Invention

The present invention relates to a three beam-type projection apparatus, and more particularly to a three beam-type projection apparatus in which three projectors can be driven integrally so as to match three beam images on a screen and to focus the images on the screen simultaneously.

2. Description of the Prior Art

Generally, in a three beam splitting-type projection apparatus, three projectors corresponding to red, green and blue colors are placed at predetermined distances away from a screen. A projecting object is projected on a screen through each projector and the images obtained therefrom are overlapped to provide a viewer with a full color image.

In the three beam splitting-type projection apparatus, when the distances between the screen and the projectors and between the projectors themselves are not exactly adjusted, the images projected through the projectors are not matched.

The conventional three beam-type projection apparatus has three projectors for projecting red, green and blue color beams.

Each projector includes a light source such as xenon lamps, a spherical reflecting mirror for reflecting the light emitted backwards to the forward direction, a collimating lens for collimating the forwardly emitted and reflected light and for converting the collimated light into parallel light, a liquid crystal display (LCD) panel (or a slide film) as the projecting object, a projecting lens, etc.

Conventionally, the projectors are driven independently to adjust the reproduced image on a screen. That is, a first image is obtained on the screen by moving the focus of the image of one projector among the three projectors, vertically and horizontally. Then, a complete image is obtained by moving the remaining projectors vertically and horizontally.

In the three beam-type projection apparatus, in case the images projected on the screen through each projecting unit do not coincide or in case the focus of the image is not accurate due to inappropriate distances between the screen and each projecting unit, the projection direction and the projection angle should be adjusted by moving each projecting unit with respect to both the screen and the remaining projecting units to compensate for the deviation.

Accordingly, the operation is very complicated and inconvenient. In addition, since the adjusting operation is implemented manually while staring at the image reproduced on the screen, an accurate adjustment is very difficult if the operator is not an expert.

U.S. Pat. No. 5,125,733 (issued to Lee) discloses a stereoscopic projector for driving a pair of projecting lens holders integrally as a method for overcoming the above-mentioned problems. In this patent, two projectors can be driven integrally and the adjustment of the image on the screen is very advantageous.

However, the apparatus utilizes only two projectors. Moreover, the apparatus is complicated and the manufacture thereof is not so advantageous.

SUMMARY OF THE INVENTION

To solve the problems of the conventional art, it is an object of the present invention to provide a novel three beam-type projection apparatus in which three projectors placed so as to form a structure of an isosceles triangle could be driven integrally, and the operation and the control thereof is very accurate and advantageous, thereby reducing the fatigue of a viewer's eyes.

To accomplish the above object, there is provided in the present invention a three beam-type projection apparatus comprising a pair of a first and a second projectors having a first and a second projecting lenses in from of the first and second projectors, respectively, being provided with a first and a second guiding grooves, respectively, having predetermined shapes formed thereon, and being connected with each other through a plurality of guiding rods; a third projector having a third projecting lens in front of the third projector, being provided with an inserting hole formed on a lower portion of the third projector and being placed above a central line between the first end second projectors; a guiding plate combined with the first, second and third projectors by being inserted into the first and second guiding grooves formed on the first and second projectors and into the inserting hole formed on the lower portion of the third projector, the guiding plate being transported forward and backward by a driving means; a fixing plate fixed on an inner and upper portion of a housing, the fixing plate being provided at one side thereof with a parallel guiding hole formed along a longitudinal direction of the third projector and being provided at the other side thereof with an inclined guiding hole formed with a predetermined inclination for guiding transportation of the third projector; and a cross link provided between the fixing plate and the third projector to combine the fixing plate and the third projector, the cross link being possibly folded and unfolded when the third projector is transported.

Preferably, the guiding plate is formers in a "T" shape, and is provided with a first and a second guiding protrusions formed at both ends of the rear lower portion of the guiding plate for being inserted into the first and second guiding grooves, respectively, formed on the first and second projectors. The guiding plate also is provided with a guiding pin at a center of the rear upper portion of the guiding plate, for being inserted into the inserting hole formed on the lower portion of the third projector.

At this time, the number of inserting holes and guiding pins can be determined as an occasion needs. However, a couple of inserting holes and a couple of corresponding guiding pins are preferred.

The cross link is provided with a hinge point at a neuter portion thereof and with a pair of link piss cross combined for being possibly folded and unfolded at the hinge point as a center point. And preferably, on the third projector, a fixing protrusion is formed for being combined with an end portion of one link piece among the link pieces forming the cross link, and a third guiding groove is formed for an end portion of the other link piece among the link pieces being inserted.

Further, it is preferred that a pair of said cross links are formed at a front and a rear portions of the third projector, respectively, and a pair of corresponding first and second fixing protrusions and a pair of corresponding third and fourth guiding grooves are formed at the front and the rear portions of the third projector.

The driving means is comprised of a driving motor and an extended transporting screw therefrom, and a corresponding transporting screw inserting groove is formed at the front portion of the guiding plate so that they can be combined.

The guiding rods are inserted into guiding rod inserting holes protrusively formed on upper and/or lower surfaces of the first and second projectors so that the first and second projectors can be moved laterally.

The three projectors in the projection apparatus according to the present invention could be driven integrally by means of a motor, and therefore, matching of the three beams of red, green and blue colors and controlling of the image on the screen could be implemented simultaneously, thereby simplifying the operation of each projector and simplifying the adjustment of the images on the screen.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE INVENTION

Hereinafter, the constituting elements and the operation principles of the projection apparatus according to an embodiment of the present invention will be explained in more detail with reference to the accompanying drawings.

Figure 1:
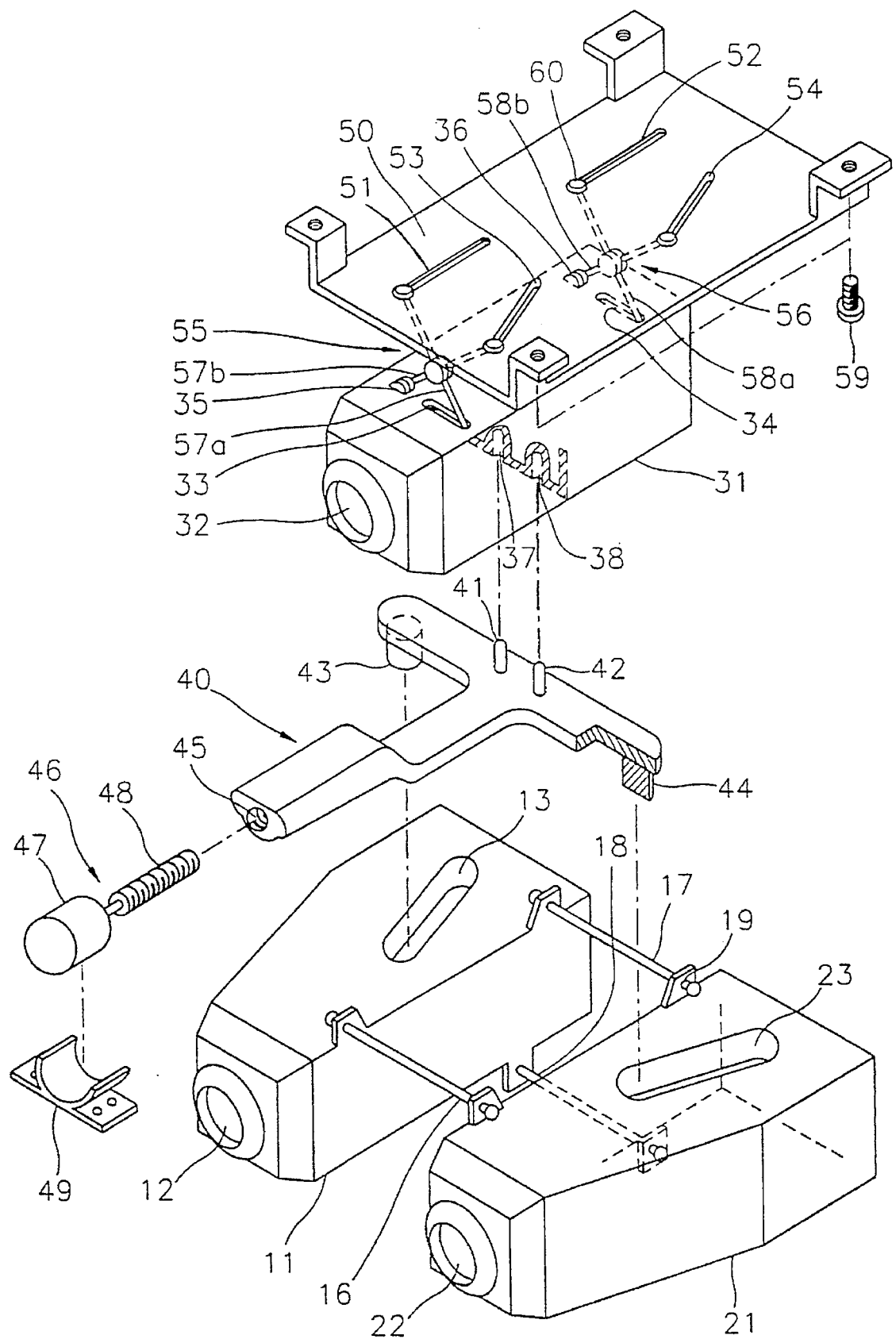
FIG. 1 is an exploded perspective view of the three beam-type projection apparatus according to the present invention.

In FIG. 1, an exploded perspective view of the three beam-type projection apparatus according to the present invention is illustrated.

First, a first projector 11 having a first projecting lens 12 attached at the front portion thereof and a second projector 21 having a second projecting lens 22 attached at the front portion thereof are provided at the lower portion of the three beam-type projection apparatus. On first and second projectors 11 and 21, a first and a second gaining grooves 13 and 23 having predetermined inclinations are formed, respectively. Also, first and second projectors 11 and 21 are connected by a plurality of guiding rods. In the drawing, they are connected by first and second guiding rods 16 and 17 formed at the upper portion of the first and second projector and a third guiding rod 18 formed at the lower portion. The guiding rods are inserted into a plurality of guiding rod inserting holes 19 which are protrusively formed on upper and lower portions of the projectors so that first and second projectors 11 and 21 could move left and right.

Above the central line between first and second projectors 11 and 21, a third projector 31 having a third projecting lens 32 formed at the front portion thereof is provided. At the lower portion of third projector 31, a first and a second guiding pin inserting holes 37 and 38 are formed in parallel.

Between first and second projectors 11 and 21 at the lower portion and third projector 31 at the upper portion, a guiding plate 40 having a "T" shape is installed. At the front portion of guiding plate 40, a transporting screw inserting groove 45 is formed. At both ends of the rear lower portion of the guiding plate, first and second guiding protrusions 43 and 44 are protrusively formed so that they can be inserted into first and second guiding grooves 13 and 23 formed on first and second projectors 11 and 21. Further, at the center of the rear upper portion of the guiding plate, first and second guiding pins 41 and 42 are protrusively formed so that they are inserted into first and second guiding pin inserting holes 37 and 38 formed on the lower portion of third projector 31.

In front of transporting screw inserting groove 45, a driving apparatus 46 for driving guiding plate 40 is installed. The driving apparatus has a driving motor 47 and a transporting screw 48 extended from the motor. The driving motor is fixed by a fixing bracket 49 and transporting screw 48 is meshed with transporting screw inserting groove 45. Accordingly, guiding plate 40 can be moved forward and backward according to the rotational direction of the driving motor.

Above third projector 31, a fixing plate 50 which is screw combined by combining screws 59 at the inner and upper portion of a housing (not shown), is provided. At the front and the rear portions of one side of fixing plate 50, a first and a second parallel guiding holes 51 and 52 are formed along the longitudinal direction of the projectors, and at the front and the rear portions of the other side of fixing plate 50, first and second inclined guiding holes 53 and 54, which are inclined to the longitudinal direction of the projectors, are formed.

First and second cross links 55 and 56 are provided between fixing plate 50 and third projector 31 to combine them. Each cross links 55 and 56 are formed by cross linking a pair of first and second link pieces 57a and 57b, and a pair of third and fourth link pieces 58a and 58b with hinge points as the center points, respectively. The link pieces can be freely folded and unfolded, respectively.

The upper end portions of each link pieces 57a, 57b, 58a and 58b are inserted into first and second parallel guiding holes 51 and 52 and first and second inclined guiding holes 53 and 54, and then are fixed by a plurality of fixing pins 60. The lower end portions of two link pieces 57a and 58a are inserted into a third and a fourth guiding grooves 33 and 34 formed on third projector 31, respectively, while the lower end portions of the remaining two link pieces 57b and 58b are combined with first and second fixing protrusions formed on third projector 31, respectively. Accordingly, two link pieces 57b and 58b are fixed on the third projector, while the remaining two link pieces 57a and 58a can move laterally within third and fourth guiding grooves 33 and 34.

The driving manner and the operation principle of the three beam-type projection apparatus having the above-mentioned elements according to the present invention will be described in detail below.

Figure 2:
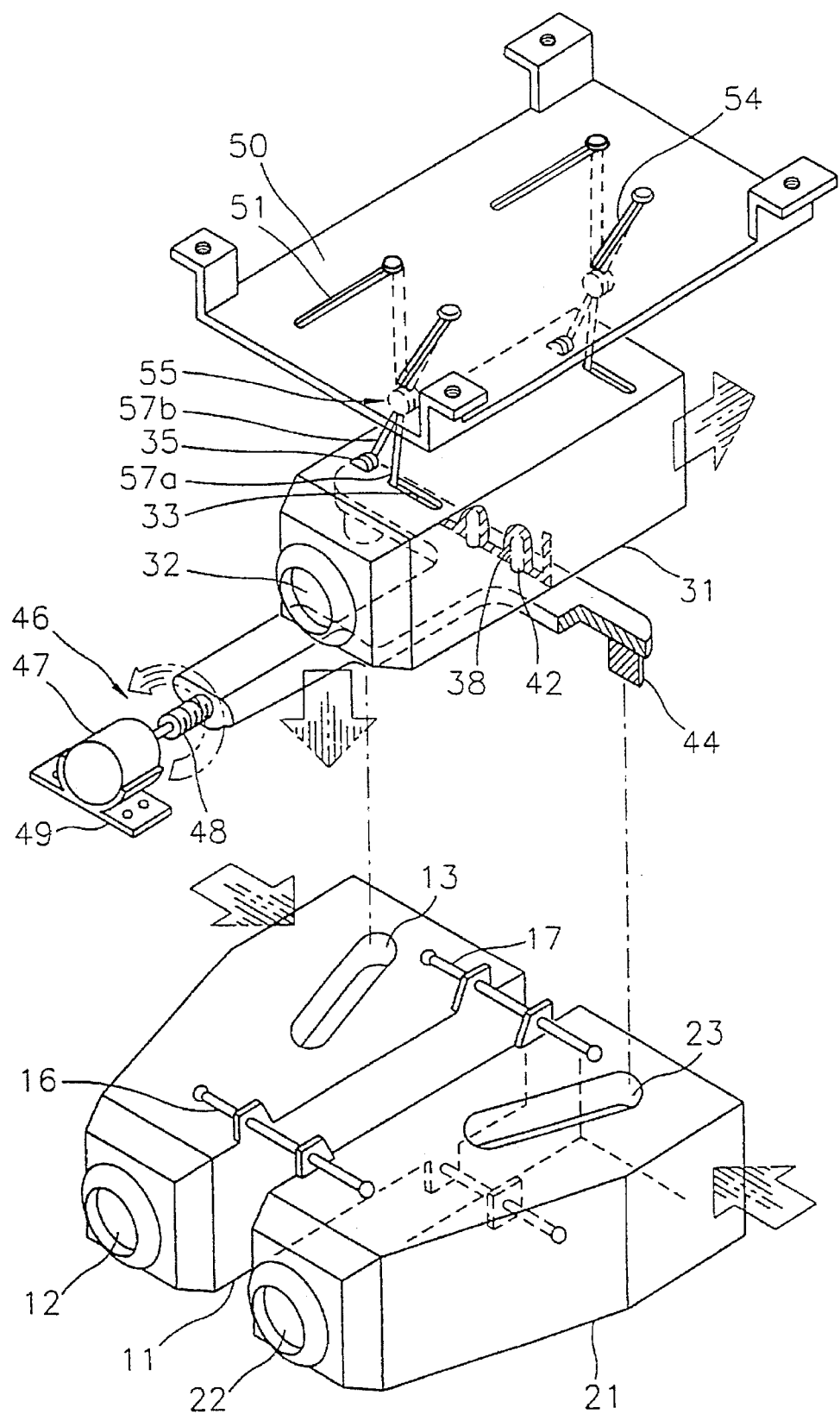
FIG. 2 is an exploded perspective view for showing the operation of the three beam-type projection apparatus according to the present invention.

FIG. 2 is a partially combined and exploded perspective view of the three beam-type projection apparatus according to the present invention. FIG. 1 corresponds to the case when the projectors are placed at the forefront position and the distances between them are at their longest, while FIG. 2 corresponds to the case when the projectors are placed at the rear end position and the distances between are at their shortest.

First, when transporting screw 48 starts to rotate by driving of driving motor 47 and is loosened from transporting screw inserting groove 45 formed at the front of guiding plate 40, guiding plate 40 is transported backward because driving apparatus 46 is fixed by fixing bracket 49. When guiding plate 40 is transported backward, first and second guiding protrusions 43 and 44 formed at both ends of the rear lower portions thereof also are transported backward. The transporting path of the guiding protrusions are determined by first and second guiding grooves 13 and 23 formed on first and second projectors 11 and 21 and being where first and second guiding protrusions 43 and 44 are inserted into, respectively.

That is, since first and second guiding grooves 13 and 23 are formed with slopes so that they are gradually separated from each other as the grooves go backward along the central line of the first and second projectors, while the distance between first and second guiding protrusions 43 and 44 is constant, first and second projectors 11 and 21 approach each other as first and second guiding protrusions 43 and 44 are transported backward. Since the two projectors are connected by guiding rods 16, 17 and 18, they can move toward the center position thereof as shown in FIG. 2.

Since as guiding plate 40 and third projector 31 are combined through first and second guiding pins 41 and 42 protrusively formed at the center of the rear upper portion of the guiding plate and first and second guiding pin inserting holes 37 and 38 formed at the lower portion of the third projector, the third projector also is transported backward as guiding plate 40 is transported backward. That is, as the guiding plate is transported backward, the first, second and third projectors are transported backward, simultaneously.

The third projector is combined with fixing plate 50 by first and second cross links 55 and 56 formed thereon. As the third projector is transported backwards, cross links 55 and 56 also are transported backwards. In this case, since the upper ends of link pieces 57a, 57b, 58a, and 58b are inserted into first and second parallel guiding holes 51 and 52 and first and second inclined guiding holes 53 and 54 formed on fixing plate 50 by fixing pins 60, link pieces 57a and 58a which are inserted into parallel guiding holes 51 and 52 are transported backward along the same passage as that of the third projector. However, link pieces 57b and 58b, which are inserted into inclined guiding holes 53 and 54, are transported backward at a slope to the passage of the third projector.

Therefore, as the end portions of link pieces 57a, 57b, 58a and 58b are transported backward, first and second link pieces 57a and 57b approach each other and third and fourth link pieces 58a and 58b approach each other. Since link pieces 57a, 57b, 58a and 58b can be folded and unfolded at the hinge points as the central points, the lower end portions of the link pieces also approach each other. At this time, the lower end portions of two link pieces 57b and 58b are fixed on the third projector by first and second fixing protrusions 35 and 36, while the lower end portions of the remaining two link pieces 57a and 58a are inserted into third and fourth guiding grooves 33 and 34, respectively, and the two link pieces 57a and 58a go near fixing protrusions 35 and 36.

Through the action of cross links 55 and 56 as described above, the cross links are folded while being transported backward. This results in pushing the third projector downward. That is, the third projector is transported backward and downward simultaneously, to approach the first and second projectors.

The projectors at the rear end position and at the closest state start to move forward while starting to separate from each other if driving motor 47 starts to rotate in the opposite direction as that described above, which is the reverse action of the action when they are transported backward. FIG. 1 corresponds to the exploded perspective view when the projectors are placed at the forefront position.

As described above, in the projection apparatus according to the present invention, three projectors can be transported backward while being gathered together, or can be transported forward while being separated from each other simultaneously, according to the rotational direction. That is, the user can advantageously adjust the projecting angles of the projectors by controlling the driving of the driving motor.

By utilizing the apparatus according to the present invention, the three projectors corresponding to red, green and blue colors can be integrally transported forward and backward, right and left, and upward and downward by means of a guiding plate which can move forward and backward. Accordingly, the distances between the projectors can be easily adjusted, image controlling projected on a screen is advantageous and the operation of the projectors is very simple.

Although the preferred embodiment of the invention has been described, it is understood that the present invention should not be limited to this preferred embodiment, but various changes and modifications can be made by one skilled in the art within the spirit and scope of the invention as hereinafter claimed.

What is claimed is:

1. A three beam-type projection apparatus comprising:

a pair of first and second projectors having a first and a second projecting lenses in front of said first and second projectors respectively, said first projector having a first guiding groove formed therein of a predetermined shape, said second projector having a second guiding groove formed therein of a predetermined shape, said first and second projectors being connected with each other through a plurality of guiding rods;

a third projector having a third projecting lens in front of said third projector, being placed in parallel with, but separated from a central line between said first and second projectors, and being provided with an inserting hole formed on a portion of said third projector facing said first and second projectors;

a guiding plate combined with said first, second and third projectors by being inserted into said first and second guiding grooves formed on said first and second projectors and into said inserting hole formed on the facing portion of said third projector, said guiding plate being transported forward and backward by a driving means;

a fixing plate fixed on an inner portion of a housing, said fixing plate being provided at one side thereof with a parallel guiding hole formed along a longitudinal direction of said third projector and being provided at the other side thereof with an inclined guiding hole formed with a predetermined inclination for guiding transportation of said third projector; and a cross link provided between said fixing plate and said third projector to combine said fixing plate and said third projector, said cross link being operable to fold and unfold when said third projector is transported.

2. The three beam-type projection apparatus as claimed in claim 1, wherein said guiding plate is formed in a "T" shape, said guiding plate being provided with a first and a second guiding protrusions formed at both ends of a rear lower portion of said guiding plate, said guiding protrusions being inserted into said first and second guiding grooves respectively, formed on said first and second projectors, and said guiding plate being provided with a guiding pin at a center rear portion of said guiding plate, said guiding pin being inserted into said inserting hole formed on the facing portion of said third projector.

3. The three beam-type projection apparatus as claimed in claim 2, wherein a couple of said inserting holes and a couple of corresponding guiding pins are formed.

4. The three beam-type projection apparatus as claimed in claim 1, wherein said cross link is provided with a hinge point at a center portion thereof and with a pair of link pieces cross-combined and operable to be folded and unfolded at said hinge point.

5. The three beam-type projection apparatus as claimed in claim 4, wherein, on said third projector, a fixing protrusion is formed for being combined with an end portion of one link piece among said link pieces forming said cross link, and a third guiding groove is formed for an end portion of the other link piece among said link pieces being inserted.

6. The three beam-type projection apparatus as claimed in claim 5, wherein a pair of said cross links are formed at a front and a rear portions of said third projector respectively, and a pair of corresponding said fixing protrusions are formed, and further comprising a fourth guiding groove disposed with said third guiding groove to form a pair of corresponding third and fourth guiding grooves formed at the front and the rear portions of said third projector.

7. The three beam-type projection apparatus as claimed in claim 1, wherein said driving means is comprised of a driving motor and an extended transporting screw therefrom, and a corresponding transporting screw inserting groove is formed at the front of said guiding plate.

8. The three beam-type projection apparatus as claimed in claim 1, wherein said guiding rods are inserted into guiding rod inserting holes protrusively formed on upper and/or lower surfaces of said first and second projectors so that the lateral spacing between said first and second projectors can change.

9. A three beam-type projection apparatus comprising:

a pair of a first and a second projectors having a first and a second projecting lenses in front of said first and second projectors respectively, said first projector having a first guiding groove formed therein of a predetermined shape, said second projector having a second guiding groove formed therein of a predetermined shape, said first and second projectors being connected with each other through a plurality of guiding rods which are inserted into guiding rod inserting holes protrusively formed on upper and/or lower surfaces of said first and second projectors so that the lateral spacing between said first and second projectors can change;

a third projector having a third projecting lens in front of said third projector, being provided with an inserting hole formed on a lower portion of said third projector and being placed above a central line between said first and second projectors;

a guiding plate formed in a "T" shape, said guiding plate being provided with a first and a second guiding protrusions formed at both ends of a rear lower portion of said guiding plate, said guiding protrusions being inserted into said first and second guiding grooves respectively, formed on said first and second projectors, said guiding plate being provided with a pair of guiding pins protrusively formed at a center of a rear upper portion of said guiding plate, said guiding pins being inserted into a pair of inserting holes formed on the lower portion of said third projector, said guiding plate being combined with said first, second and third projectors, said guiding plate being provided with a transporting screw inserting groove at a front portion thereof and being transported forward and backward by a driving means comprising a driving motor and an extended transporting screw therefrom;

a fixing plate fixed on an inner and upper portion of a housing, said fixing plate being provided at one side thereof with a parallel guiding hole formed along a longitudinal direction of said third projector, and being provided at the other side thereof with an inclined guiding hole formed at a predetermined inclination for guiding transportation of said third projector; and a cross link provided between said fixing plate and said third projector to combine said fixing plate and said third projector, said cross link being comprised of a pair of link pieces which are operable to fold and unfold at a hinge point as a center point when said third projector is transported, wherein on said third projector, a fixing protrusion is formed for being combined with an end portion of one link piece among said link pieces forming said cross link, and a third guiding groove is formed for an end portion of the other link piece among said link pieces being inserted; and wherein a pair of said cross links are formed at a front and a rear portions respectively, of said third projector, and a pair of corresponding first and second fixing protrusions and a pair of corresponding third and fourth guiding grooves are formed at the front and the rear portions of said third projector.

\* \* \* \* \*